No. 703,215. Patented June 24, 1902.
O. C. PINNEY.
SUBMERGED WATER HEATER.
(Application filed Nov. 23, 1900.)

(No Model.)

Witnesses:
E. B. Gilchrist
F. D. Ammen

Inventor:
Orestes C. Pinney,
By his Attorneys,
Thurston & Bates.

United States Patent Office.

ORESTES C. PINNEY, OF GLENVILLE, OHIO.

SUBMERGED WATER-HEATER.

SPECIFICATION forming part of Letters Patent No. 703,215, dated June 24, 1902.

Application filed November 23, 1900. Serial No. 37,499. (No model.)

*To all whom it may concern:*

Be it known that I, ORESTES C. PINNEY, a citizen of the United States, residing at Glenville, in the county of Cuyahoga and State of Ohio, have invented a certain new and useful Improvement in Submerged Water-Heaters, of which the following is a full, clear, and exact description, reference being had to the accompanying drawings.

The object of the invention is to provide a cheap but highly-efficient heater adapted to be partly submerged in a body of water in a bath-tub or baptistry or analogous device for the purpose of heating said water.

It consists in the construction and combination of parts hereinafter described, and pointed out definitely in the claims.

Figure 1:
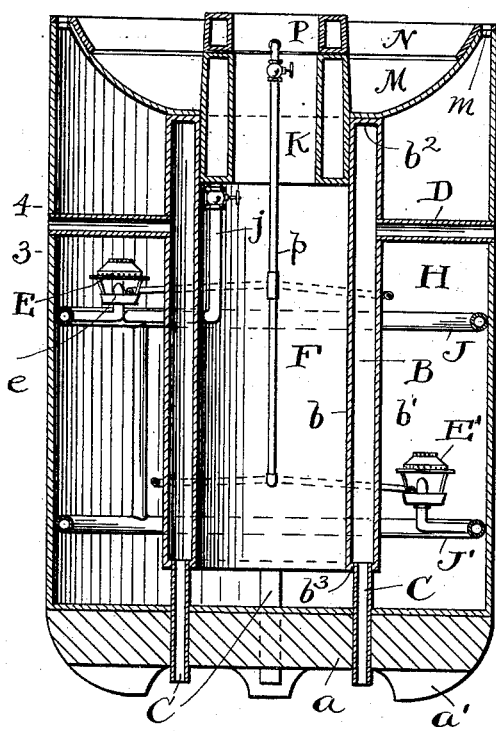
Figure 3:
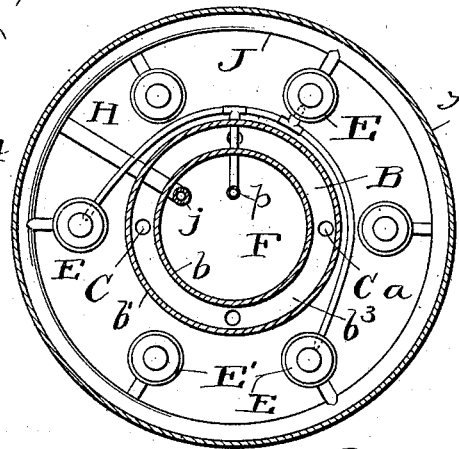
Figure 2:
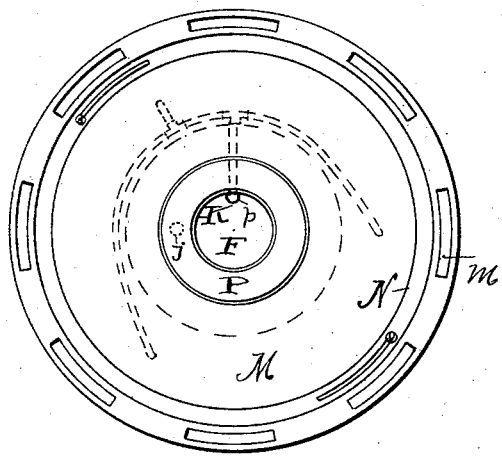
Figure 4:
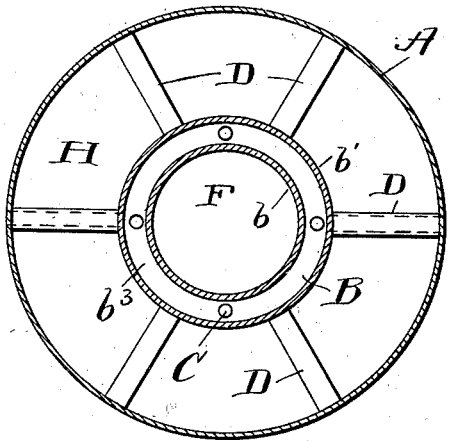

Figure 1 is a central vertical section of a heater embodying my invention. Fig. 2 is a plan view of the same. Fig. 3 is a horizontal sectional view on the line 3 3 of Fig. 1. Fig. 4 is a horizontal section on the line 4 4 of Fig. 1.

Referring to the parts by letters, A represents an outer sheet-metal drum having a closed and weighted bottom $a$ and legs $a'$, which project below the bottom and upon which the apparatus is supported. Within this drum is an annular sheet-metal water-chamber B, composed of two concentric tubes $b$ $b'$ and the top and bottom plates $b^2$ $b^3$, which close the space between said tubes. The space within the tube $b$ forms a vertical down-draft-flue F, which is surrounded by said water-chamber B. Vertical pipes C pass through the bottom $a$ and through the bottom plate $b^3$ of the water-chamber, and these pipes are open and admit the water freely into said water-chamber. A plurality of laterally-extended outlet-pipes D are connected with the hot-water chamber near its upper end, and they extend out through the wall of the drum A. The space between the hot-water chamber and the outer wall of the drum constitutes a heating-chamber H, which is heated by suitable heat-generating devices. In this construction shown these heat-generators are gasolene-burners E E', arranged in two horizontal rows within the heating-chamber. The air to supply the combustion enters through the downdraft-flue F, passes under the water-chamber and up into the heating-chamber H, passing out of the top thereof.

The cold water enters the chamber B through the pipe C, is heated by the heat in the chamber H, and consequently it rises and passes out through the outlet-pipes D. The circulation of the water due to the described construction greatly facilitates the heating of the body of water in which the apparatus is placed.

The burners E are connected with the annular pipes J J', which are secured within the heating-chamber to the drum A. These annular pipes are connected by a supply-pipe $j$ with a gasolene-tank K, which is of annular form, and is secured in the upper end of the water-chamber. A cover M embraces this gasolene-tank and rests upon the top of the hot-water chamber and inclines upward toward the top of the drum A and extends over and rests upon the top of said drum. In this cover, near the drum A, are a plurality of curved slots $m$, through which the heat and products of combustion escape. These slots may be reduced in size by the action of the sliding damper-plate N.

When gasolene-burners are employed, it is necessary that they be heated before they are lighted to initiate the generation of gas from the gasolene. I prefer to employ alcohol for this purpose, and to that end an annular tank P rests upon the gasolene-tank. A valve-pipe $p$ extends downward therefrom in the downdraft-flue F and then into the heating-chamber, where its branches discharge into the cups $e$ beneath the burners.

To set this apparatus into operation, the cover M must be removed before the burners can be lighted. When after the burners are lighted the cover is replaced, the air flows down through the flue F, under the water-chamber, up through the heating-chamber to supply the combustion, and the products of combustion and unused air pass out through said slots.

Having described my invention, I claim—

1. In a submerged water-heater, the combination of a sheet-metal drum closed at its bottom, a closed annular water-chamber within said drum, the space within the chamber constituting an open down-flue, vertical water-inlet pipes passing through the bottom of the drum and into the bottom of said water-chamber, laterally-extended water-outlet pipes connected with the water-chamber near its top and extending across the heating-chamber and out through the wall of the drum, and heat-generators located in the space between the water-chamber and the drum and above the lower end of the water-chamber, whereby the air in the drum around said water-chamber is heated and caused to flow up and out through the top of the drum and air to supply the combustion is drawn down through the flue passing through said water-chamber, substantially as specified.

2. The combination of a sheet-metal drum closed at its bottom, an annular closed water-chamber within said drum, the space within the chamber constituting an open down-flue, inlet-pipes passing through the bottom of the drum and into the bottom of the water-chamber, laterally-extended outlet-pipes connected with the water-chamber near its top and passing out through the wall of said drum, a plurality of burners located in the space between the drum and water-chamber, and above the lower end of the latter and pipes lying in the down-flue for supplying fuel to said burners, substantially as specified.

3. The combination of a sheet-metal drum closed at its bottom, a closed annular water-chamber in said drum, the space within the chamber constituting an open down-flue, inlet-pipes connected with the bottom of the water-chamber and extended out through the bottom of the drum, outlet-pipes connected with the water-chamber near its top and extended out through the side of the drum, a plurality of burners located in the space between said water-chamber and drum, an annular liquid-fuel tank secured to the upper end of said water-chamber, and pipes leading through the down-flue connecting said fuel-tank with said burners, substantially as specified.

4. The combination of a sheet-metal drum closed at its bottom, a closed annular water-chamber in said drum, inlet-pipes connected with the bottom of the water-chamber and extended out through the bottom of the drum, outlet-pipes connected with the water-chamber near its top and extended out through the side of the drum, a plurality of burners located in the space between said water-chamber and drum, an annular liquid-fuel tank secured to the upper end of said water-chamber, and pipes connecting said tank with said burners, an annular alcohol-tank also supported by said water-chamber and having pipes leading to the drip-cups of said burners, substantially as specified.

5. The combination of a sheet-metal drum closed at its bottom, a closed annular water-chamber in said drum, inlet-pipes in said water-chamber passing through the bottom of the drum, outlet-pipes to said chamber connected with it near its top and extended out through the walls of said drum, heat-generators located substantially as described whereby to heat the space between the water-chamber and drum, and an annular cover resting upon the top of the water-chamber and inclined therefrom upwardly and outwardly to the top of the drum upon which it also rests, there being a plurality of slots in said cover near its upper edge, substantially as specified.

6. The combination of a sheet-metal drum closed at its bottom and open at top, an annular inclosed vertical water-chamber extending nearly to the bottom of the drum with its open inner space which acts as a downdraft-flue, and burners located in the space between said drum and the water-chamber and above the lower end of the latter, substantially as specified.

In testimony whereof I hereunto affix my signature in the presence of two witnesses.

ORESTES C. PINNEY.

Witnesses:
ALBERT H. BATES,
H. M. WISE.